(12) United States Patent
Lee

(10) Patent No.: US 12,208,700 B2
(45) Date of Patent: Jan. 28, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Hyejoo Lee, Gyeonggi-do (KR)

(73) Assignees: Hyundai Motor Company, Seoul (KR); KIA Corporation, Seoul (KR)

(*) Notice: Subject to any disclaimer, the term of this patent is extended or adjusted under 35 U.S.C. 154(b) by 215 days.

(21) Appl. No.: 17/942,377

(22) Filed: Sep. 12, 2022

(65) Prior Publication Data

US 2023/0166617 A1    Jun. 1, 2023

(30) Foreign Application Priority Data

Nov. 29, 2021  (KR) .................. 10-2021-0166577

(51) Int. Cl.
| | |
|---|---|
| *B60L 53/37* | (2019.01) |
| *B60K 35/00* | (2024.01) |
| *B60K 35/22* | (2024.01) |
| *B60K 35/28* | (2024.01) |
| *B60L 53/36* | (2019.01) |
| *B60L 53/38* | (2019.01) |
| *B60L 53/66* | (2019.01) |
| *G06V 20/58* | (2022.01) |

(52) U.S. Cl.
CPC ............ *B60L 53/37* (2019.02); *B60K 35/00* (2013.01); *B60L 53/36* (2019.02); *B60L 53/38* (2019.02); *B60L 53/66* (2019.02); *G06V 20/58* (2022.01); *B60K 35/22* (2024.01); *B60K 35/28* (2024.01); *B60K 2360/16* (2024.01)

(58) Field of Classification Search
CPC .......... B60L 53/36; B60L 53/37; B60L 53/38; B60L 53/66; G06V 20/58; B60K 35/00; B60K 35/22; B60K 35/28; B60K 2360/16
USPC ............................................. 701/22
See application file for complete search history.

(56) References Cited

U.S. PATENT DOCUMENTS

| | | | |
|---|---|---|---|
| 9,694,685 B2* | 7/2017 | Ricci ................. | B60L 53/65 |
| 9,836,972 B2* | 12/2017 | Kees .................. | B60L 53/305 |
| 10,220,717 B2* | 3/2019 | Ricci ................. | B60L 53/12 |
| 10,418,863 B1* | 9/2019 | Jadidian ............ | H02J 7/0042 |
| 10,532,663 B2* | 1/2020 | Ricci ................. | B60L 53/126 |
| 2010/0225475 A1 | 9/2010 | Karch et al. | |
| 2010/0277121 A1* | 11/2010 | Hall ................... | H02J 50/90 |
| | | | 320/108 |

(Continued)

FOREIGN PATENT DOCUMENTS

| | | |
|---|---|---|
| JP | 2016-111778 A | 6/2016 |
| KR | 10-2012-0081051 | 7/2012 |

(Continued)

*Primary Examiner* — Atul Trivedi
(74) *Attorney, Agent, or Firm* — Morgan, Lewis & Bockius LLP

(57) ABSTRACT

A vehicle and a method of controlling the same includes: a display configured to emit light to a ground surface, a communicator configured to receive a movement signal of the vehicle through communication with an external terminal, and a controller configured to determine a moving area of the vehicle based on the received movement signal of the vehicle, determine a danger area and a safety area included in the moving area, and control the display to emit light to the danger area and the safety area.

18 Claims, 10 Drawing Sheets

(56) References Cited

U.S. PATENT DOCUMENTS

| | | | |
|---|---|---|---|
| 2012/0112534 A1* | 5/2012 | Kesler | B60L 53/305 307/9.1 |
| 2012/0112535 A1* | 5/2012 | Karalis | B60L 53/124 307/9.1 |
| 2012/0119569 A1* | 5/2012 | Karalis | B60L 53/302 307/9.1 |
| 2012/0119575 A1* | 5/2012 | Kurs | H02J 50/12 307/9.1 |
| 2012/0313449 A1* | 12/2012 | Kurs | B60L 53/126 307/104 |
| 2012/0313742 A1* | 12/2012 | Kurs | B60L 53/126 336/180 |
| 2013/0076296 A1 | 3/2013 | Ushiroda | |
| 2013/0175875 A1* | 7/2013 | Kurs | H02J 50/80 307/104 |
| 2013/0334892 A1* | 12/2013 | Hall | B60L 53/124 307/104 |
| 2014/0012448 A1 | 1/2014 | Tripathi et al. | |
| 2014/0222271 A1* | 8/2014 | Merten | H02J 50/10 701/22 |
| 2014/0312706 A1* | 10/2014 | Fiorello | B60L 53/51 307/104 |
| 2015/0270719 A1* | 9/2015 | Kurs | H02J 50/80 320/108 |
| 2015/0357860 A1* | 12/2015 | Wippler | H02J 50/80 320/108 |
| 2016/0352113 A1* | 12/2016 | Zhao | B60L 53/14 |
| 2017/0136880 A1* | 5/2017 | Ricci | B60M 7/003 |
| 2019/0025830 A1* | 1/2019 | O'Brien | B60L 53/36 |
| 2019/0184841 A1* | 6/2019 | Van Wiemeersch | B60L 53/66 |
| 2019/0299802 A1* | 10/2019 | Neubecker | B60L 53/68 |
| 2019/0329667 A1* | 10/2019 | Strasser | G06V 20/56 |
| 2019/0381910 A1* | 12/2019 | Akhavan-Tafti | B60L 53/65 |
| 2020/0033852 A1* | 1/2020 | Park | G05D 1/106 |
| 2020/0039373 A1* | 2/2020 | Cantrell | H02J 50/90 |
| 2020/0269977 A1* | 8/2020 | Noble | G08G 5/0056 |
| 2020/0307403 A1* | 10/2020 | Rastoll | B60L 53/66 |
| 2020/0389053 A1* | 12/2020 | Lee | H04B 5/79 |
| 2021/0046831 A1* | 2/2021 | Kim | B60L 53/35 |
| 2021/0088992 A1 | 3/2021 | Lee et al. | |
| 2021/0129697 A1* | 5/2021 | Cho | B60L 53/62 |
| 2023/0052733 A1* | 2/2023 | Beaurepaire | G01C 21/3811 |
| 2023/0166614 A1* | 6/2023 | Lee | B60L 53/37 701/41 |
| 2023/0166616 A1* | 6/2023 | Lee | B60L 53/36 701/22 |
| 2023/0234464 A1* | 7/2023 | Nasr | H02J 7/0042 701/22 |
| 2023/0398895 A1* | 12/2023 | Lu | B60L 53/305 |
| 2023/0408277 A1* | 12/2023 | Lu | G01C 21/3614 |
| 2024/0167831 A1* | 5/2024 | Swartz | B60L 58/12 |
| 2024/0239226 A1* | 7/2024 | Lu | B60L 53/68 |

FOREIGN PATENT DOCUMENTS

| | | | | |
|---|---|---|---|---|
| KR | 20190104477 A | * | 9/2019 | B60W 10/26 |
| KR | 10-2021-0069930 A | | 6/2021 | |
| KR | 20230168978 A | * | 12/2023 | H01M 4/525 |
| WO | WO-2010060720 A2 | * | 6/2010 | B60L 11/1816 |
| WO | WO-2020176860 A1 | * | 9/2020 | B60L 53/12 |
| WO | WO-2022189803 A1 | * | 9/2022 | B60L 53/16 |

* cited by examiner

| SSID | AMOUNT OF CHARGING POWER | REQUIRED TIME | FAILURE COUNT | CHARING EFFICIENCY |
|---|---|---|---|---|
| SSID A | 14kWh | 11h 23m | - | A |
| SSID B | 23.1kWh | 23h 40m | - | A |
| SSID C | 0 | 0 MINUTES | O | F |
| SSID D | 0.1 | 1 MINUTES | O | F |

VEHICLE AND METHOD OF CONTROLLING THE SAME

CROSS-REFERENCE TO RELATED APPLICATION

The present application claims priority to Korean Patent Application No. 10-2021-0166577, filed on Nov. 29, 2021, the entire contents of which is incorporated herein for all purposes by this reference.

BACKGROUND OF THE PRESENT DISCLOSURE

Field of the Present Disclosure

The present disclosure relates to a vehicle and a method of controlling the same that are capable of, when a plurality of wireless charging pads (service set identifiers, SSIDs) are present in a public wireless charging facility, allowing a user to select a wireless charging pad desired for pairing (service set identifier, SSID) and recommend the selected SSID.

Description of Related Art

An electric vehicle refers to a transportation device that travels on a road or railway using electricity as a power source, and because the electric vehicle utilizes electricity as a power source based on a battery, various battery charging methods are being developed.

As a method of more conveniently charging a battery of an electric vehicle, wireless charging technology is being provided and ongoing efforts are taken to build and distribute public wireless charging facility infrastructure.

Accordingly, there is a demand for a technology of recommending a wireless charger having optimal efficiency to a user in a public wireless charging facility.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a method of controlling the same that are configured for recommending a wireless charger by obtaining image information around a vehicle, receiving wireless charger information through communication with a server, and combining the image information with the wireless charger information.

The technical objectives of the present disclosure are not limited to the above, and other objectives may become apparent to those of ordinary skill in the art based on the following descriptions.

According to an aspect of the present disclosure, there is provided a vehicle including: a camera configured to obtain image information around the vehicle; a communicator configured to receive wireless charger information related to wireless chargers through communication with an external server; and a controller communicatively connected to the communicator and configured to combine the received wireless charger information with the image information including information related to an obstacle around the wireless chargers, to recommend at least one wireless charger to a user interface among the wireless chargers.

The controller may be configured to recommend the wireless charger in which the received wireless charger information indicates a chargeable state and an obstacle is not present within an area of the at least one wireless charger based on the image information.

The controller may be configured to use an amount of charging power and a charging required time of each of the wireless chargers stored in the server to recommend the wireless charger in which the amount of the charging power compared to the charging required time is a greatest first.

The controller may be configured to use specifications of the vehicle stored in a memory to select a wireless charger in which an amount of charging power compared to a charging required time is greatest among the wireless chargers according to a vehicle type and a vehicle height of the vehicle.

The controller may be configured to display the recommended at least one wireless charger in a form of a list on the user interface.

The controller may be configured to differently display an area of a wireless charger which is not recommended among the wireless chargers from an area of the recommended at least one wireless charger in a form of an image on the user interface.

The controller may be configured to, when a user selects the recommended wireless charger, pair the vehicle with the wireless charger and guide the vehicle to an area in which the amount of charging power compared to the charging required time.

The controller may be configured to display a position adjustment message or a position adjustment image of the vehicle on the user interface to guide the vehicle.

The controller may be configured to, when the vehicle is paired with the wireless charger and charging of the vehicle is completed, transmit an amount of charging power and a charging required time to the external server.

According to another aspect of the present disclosure, there is provided a method of controlling a vehicle, the method including: obtaining image information around the vehicle from a camera; receiving wireless charger information related to wireless chargers through communication with an external server; and combining the received wireless charger information with the image information including information related to an obstacle around the wireless chargers, to recommend at least one wireless charger to a user interface among the wireless chargers.

The recommending of the wireless charger may include recommending the wireless charger in which the received wireless charger information indicates a chargeable state and an obstacle is not present within an area of the at least one wireless charger based on the image information.

The recommending of the wireless charger may include using an amount of charging power and a charging required time of each of the wireless chargers stored in the server to recommend the wireless charger in which the amount of the charging power compared to the charging required time is a greatest first.

The recommending of the wireless charger may include using specifications of the vehicle stored in a memory to select a wireless charger in which an amount of charging power compared to a charging required time is greatest among the wireless chargers according to a vehicle type and a vehicle height of the vehicle.

The method may further include displaying the recommend at least one wireless charger in a form of a list on the user interface.

The method may further include differently displaying an area of a wireless charger which is not recommended among the wireless chargers from an area of the recommended at least one wireless charger in a form of an image on the user interface.

The method may further include, when a user selects the recommended wireless charger, pairing the vehicle with the wireless charger and guiding the vehicle to an area of the wireless charger in which the amount of the charging power compared to the charging required time is greatest.

The guiding of the vehicle may include displaying a position adjustment message or a position adjustment image of the vehicle on the user interface to guide the vehicle.

The method may further include, when the vehicle is paired with the wireless charger and charging of the vehicle is completed, transmitting an amount of charging power and a charging required time to the external server.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
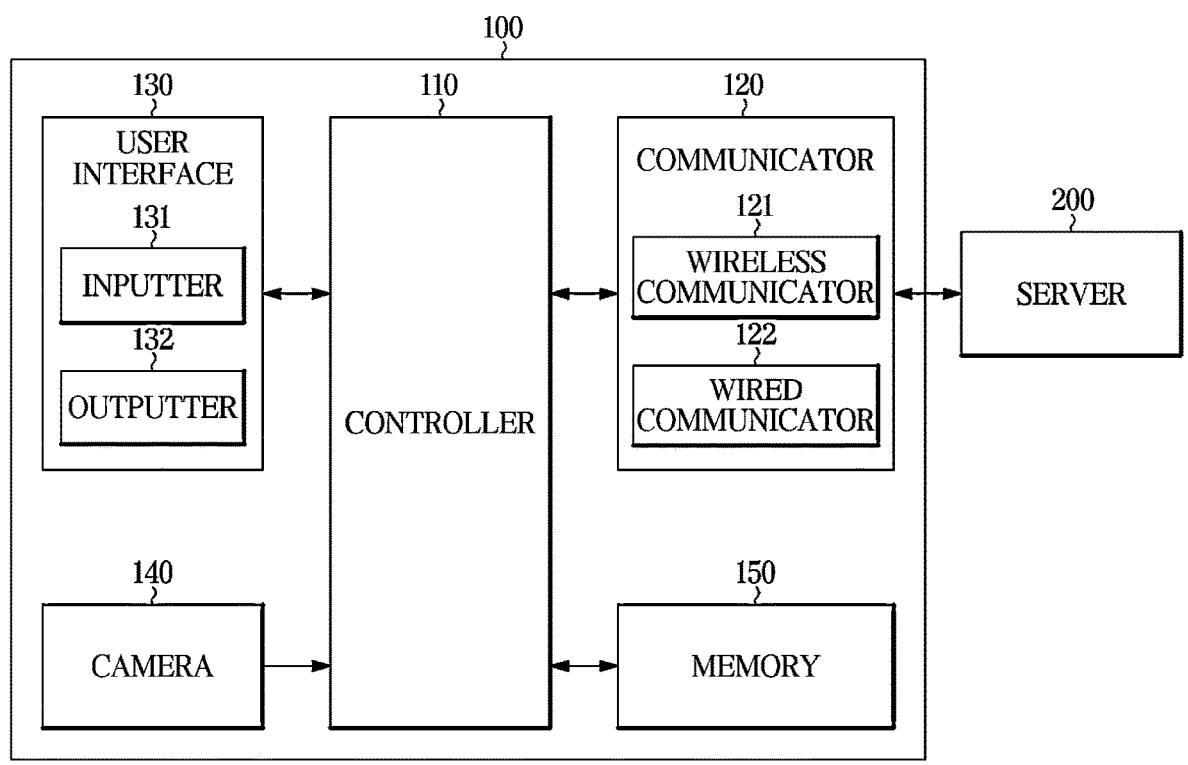
FIG. 1 is a diagram illustrating a control block diagram of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments described in the present specification and the configurations shown in the drawings are only examples of exemplary embodiments of the present disclosure, and various modifications may be made at the time of filing of the present disclosure to replace the exemplary embodiments and drawings of the present specification.

Identical symbols or numbers in the drawings of the present disclosure denote components or elements configured to perform substantially identical functions.

The terms used herein are for describing the exemplary embodiments and are not intended to restrict and/or to limit the present disclosure. For example, the singular expressions herein may include plural expressions, unless the context clearly dictates otherwise. Furthermore, the terms "comprises" and "has" are intended to display that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to differentiate one component from another. For example, without departing from the scope of the present disclosure, the first component may be referred to as a second component, and similarly, the second component may in addition be referred to as a first component.

The terms, such as "~part", "~device", "~block", "~member", "~module", and the like may refer to a unit of processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Meanwhile, the disclosed exemplary embodiments of the present disclosure may be embodied in the form of a recording medium storing instructions executable by a computer. The instructions may be stored in the form of program code, and when executed by a processor, may generate a program module to perform the operations of the disclosed exemplary embodiments of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, an exemplary embodiment of a vehicle 100 and a method of controlling the vehicle 100 according to one aspect will be described in detail with reference to the accompanying drawings.

FIG. 1 is a diagram illustrating a control block diagram of a vehicle 100 according to an exemplary embodiment of the present disclosure.

Referring to FIG. 1, a vehicle 100 includes a communicator 120 for performing wired/wireless communication with external and internal devices, a user interface 130 including an inputter 131 and an outputter 132, a camera 140 for photographing the surroundings of the vehicle 100, a memory 150 for storing information required for control related to the vehicle 100 in a transitory or non-transitory manner, and a controller 110 for controlling the above described components.

Furthermore, the vehicle 100 may wirelessly communicate with an external server 200 by controlling the communicator 120 through the controller 110.

The communicator 120 may communicate with another vehicle or the external server 200 through a wireless communication base station, and may include a wireless communicator 121 and a wired communicator 122.

As an example of the communication method, the communicator 120 may employ the second generation (2G) communication method, such as Time Division Multiple Access (TDMA) and Code Division Multiple Access (CDMA), the third generation (3G) communication method, such as a wideband code Wide Code Division Multiple Access (WCDMA), Code Division Multiple Access 2000 (CDMA2000), Wireless Broadband (Wibro), and Worldwide Interoperability for Microwave Access (WiMAX), and the fourth generation (4G) communication method, such as Long Term Evolution (LTE) and WiBro Evolution. The communicator 120 may employ the fifth generation (5G) communication method.

The communicator 120 may include one or more components that enable communication with an external device, and may include, for example, at least one of a short-range communication module, the wired communicator 122, and the wireless communicator 121.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, a Near-field communication (NFC) communication module, and a zigbee communication module.

The wired communicator 122 may include various wired communicators, such as a controller area network (CAN) communication module, a local area network (LAN) module, a wide area network (WAN) module, or a value added network communication (VAN) module, and may also include various cable communication modules, such as a universal serial bus (USB), a high definition multimedia interface (HDMI), a digital visual interface (DVI), a recommended standard-232 (RS-232), a power line communication module, or a plain old telephone service (POTS).

The wireless communicator 121 may include Radio Data System-Traffic Message Channel (RDS-TMC), Digital Multimedia Broadcasting (DMB), Wi-Fi module, Wi-Bro module, and may also include a wireless communicator 121 that supports a global System for Mobile Communication (GSM), CDMA, WCDMA, universal mobile telecommunications system (UMTS), TDMA, LTE, etc.

The wireless communicator 121 may include a wireless communication interface including an antenna and a receiver for receiving information related to a wireless charger 400. Furthermore, the wireless communicator 121 may further include a signal conversion module for demodulating an analog wireless signal received through the wireless communication interface into a digital control signal.

Upon receiving information related to the wireless charger 400, the communicator 120 may, transmit the corresponding data to the controller 110, or receive a control signal for requesting information to the other vehicle from the controller 110 and transmit the control signal to the other vehicle.

The user interface 130 may include an inputter 131 and an outputter 132. The inputter 131 may receive a command related to pairing of the wireless charger 400 from the user and transmit the command to the controller 110, and the outputter 132 may display a recommended wireless charger 400 or display a notification about information related to the wireless charger 400.

The user interface 130 may include an Audio Video Navigation (AVN) display. However, in an exemplary embodiment of the present disclosure, the inputter 131 for receiving a user command and the outputter 132 for displaying a notification are not limited to the AVN display.

The user interface 130 is not limited to the AVN display so that the inputter 131 may be variously provided as long as it can allow a user to input a command and the outputter 132 may be variously provided as long as it can allow the user to identify displayed contents and present a warning message.

For example, the inputter 131 may be an automotive voice recognition system for a vehicle, and the outputter 132 may be an internal speaker of the vehicle 100 that outputs sound.

When a user utters a command with a speech, the automotive voice recognition system for a vehicle may analyze the input command to determine a domain corresponding to the command and perform an operation.

Accordingly, when the inputter 131 is implemented using an automotive voice recognition system for a vehicle, the user may pair the vehicle 100 with the wireless charger 400 or cancel the pairing by a speech.

Furthermore, the inputter 131 may be used for an electric system for controlling the vehicle 100, and may control an air conditioning system of the vehicle 100 or input a destination into a navigation system through speech recognition.

Furthermore, the outputter 132 may display information indicating the state of the vehicle 100, display information for guiding setting of the vehicle 100, display a navigation screen, display multimedia content, or display travelling related information.

The camera 140 may be mounted in at least one position inside the vehicle 100 in which the surroundings of the vehicle 100 is photographable.

Alternatively, an external terminal provided with the camera 140 may be connected to the vehicle 100 to perform the function of the camera 140 for photographing the surroundings of the vehicle 100. The connection between the external terminal and the vehicle 100 may be performed through wireless communication, such as Bluetooth, or through a wired cable.

The camera 140 may be a built-in cam (Drive Video Record System: DVRS) mounted on the vehicle 100 or a black box separately mounted in the vehicle 100, but the present disclosure is not limited thereto.

The camera 140 may be provided using any configuration as long as it is an imaging device configured for obtaining a surrounding image of the vehicle 100 by photographing surroundings of the vehicle 100.

The memory 150 may be used to store images of the surrounding of the vehicle 100 captured by the camera 140 provided in the vehicle 100 in units of frames. Furthermore, the memory 150 may be used to store information related to the wireless charger 400 received from the external terminal through the communicator 120.

The memory 150 may include a volatile memory, such as a Static Random Access Memory (S-RAM), D-RAM, etc., and a non-volatile memory, such as a read only memory (ROM) and an erasable programmable read only memory (EPROM). The memory 150 may include a single memory element or a plurality of memory elements.

The controller 110 may control the communicator 120, the user interface 130, the camera 140, and the memory 150 to recommend the wireless charger 400, and allow the user to selectively pair the vehicle 100 with the wireless charger 400.

The controller 110 may control the communicator 120 to receive information related to the wireless charger 400 from the external server 200, and combine the information related to the wireless charger 400 with image information collected from the camera 140 to recommend the most suitable charger for charging among the wireless chargers 400.

The information related to the wireless charger 400 transmitted from the server 200 to the controller 110 may include information related to a service set identifier (SSID) corresponding to a unique identification number of the wireless charger 400, a charging-ability of each wireless charger 400, a recent amount of charging power of each wireless charger 400, a recent charging required time of each wireless charger 400, a charging failure count of each wireless charger 400, a charging efficiency of each wireless charger 400, and the like.

In the instant case, the SSID of the charger is a service set identifier, which is a unique identifier including 32-characters attached to a header of a packet transmitted over the wireless LAN.

The SSID identifies a basic service set (BSS) to be accessed by a wireless device. The SSID may distinguish multiple wireless LANs from each other.

Therefore, all access points (APs) and all terminal/station devices that desire to use a specific wireless LAN may use the same SSID.

Devices that do not use a unique SSID may not be able to join the BSS, and the SSID, which is seen as plaintext, does not provide any security features to the network.

The controller 110 may exclude the wireless charger 400 which is identified as being in a chargeable state from the information related to the wireless charger 400 received from the server 200 but has the obstacle 500 present nearby in the image information obtained through the camera 140, from the recommended chargers.

The vehicle 100 according to various exemplary embodiments of the present disclosure may exclude the wireless charger 400, which is determined as being available for use due to wireless charging not in progress currently but has the obstacle 500 nearby present, such as a vehicle not supporting wireless charging, a motorcycle, a load, a vehicle for which wireless charging is completed, and the like, from the recommendation list.

Accordingly, a driver who desires to pair a wireless charger may exclude a wireless charger 400 which may be recommended due to wireless charging not in progress currently even with the inability to perform wireless charging due to a presence of the obstacle 500, from pairing targets.

As a result, the user may not need to move the vehicle 100 to the front of the wireless charger 400 to check the obstacle 500 present in the area of the wireless charger 400 with the naked eyes, and may pair the wireless charger 400 with the vehicle 100 with optimum efficiency.

The vehicle 100 may perform Vehicle-To-Everything (V2X), Vehicle-To-Grid (V2G) communication, etc. with the external server 200 that manages a charging station. In the instant case, V2X communication is a technology for sharing information with the vehicle 100 or surrounding communication infrastructure for providing safety and convenience to users. IEEE 802.11p defines data transmission and reception for V2X communication, and SAE J2735 defines application messages for V2X communication.

Furthermore, V2G communication is a technology of controlling supply according to a power demand through the connection of the electric vehicle 100, the charging station, and the power grid network, and IEC 61850 may define a communication protocol for managing a charging station, which is one of energy storage devices, in the power grid 105.

The server 200 may manage information related to the SSID corresponding to the unique identification number of the wireless charger 400, the charging-ability of each wireless charger 400, the recent amount of charging power of each wireless charger 400, the recent charging required time of each wireless charger 400, the charging failure count of each wireless charger 400, the charging efficiency of each wireless charger 400, and the like and provide the information to the vehicle 100 when required.

Figure 2:
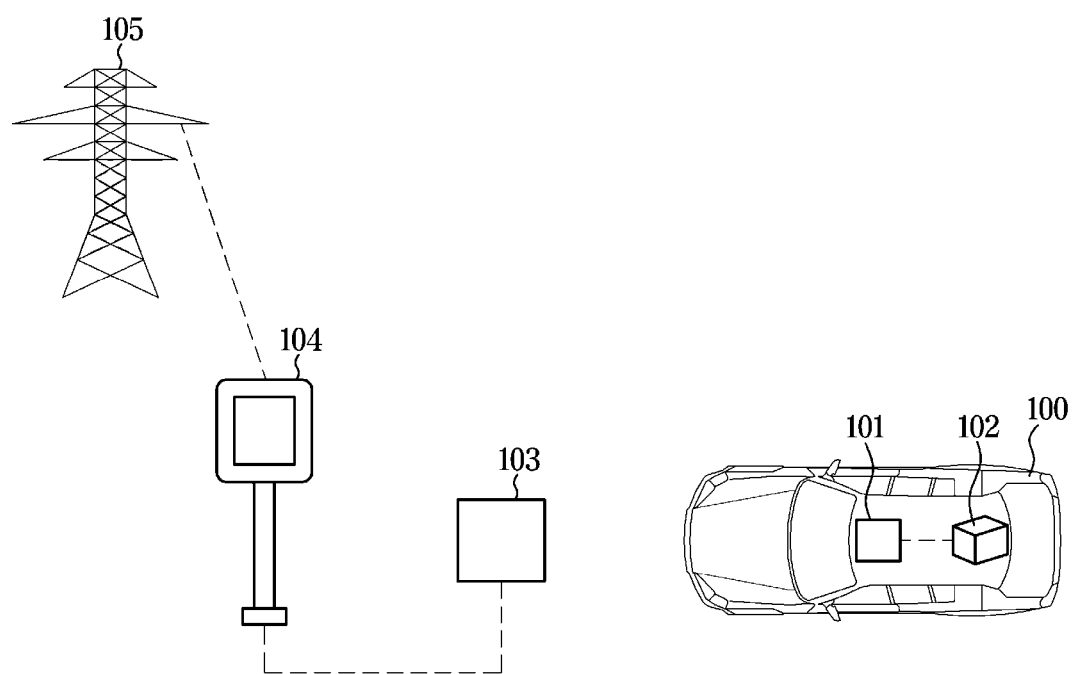
FIG. 2 is a diagram illustrating a structure related to wireless power transmission in a vehicle according to an exemplary embodiment of the present disclosure.

FIG. 2 is a diagram illustrating a structure related to wireless power transmission in a vehicle 100 according to an exemplary embodiment of the present disclosure.

Referring to FIG. 2, wireless power transmission may be performed by at least one component of the vehicle 100 using electricity as power and a wireless charging station 300, and may be used to transmit power to the vehicle 100 that utilizes electricity as power wirelessly.

The charging of the vehicle 100 using electricity as power may be performed by: transmitting, by a base for converting and controlling the power of a power distribution network, power to a receiving coil of the vehicle 100 through a transmitting coil; and charging, by a wireless charging control device of the vehicle 100, the power source or the battery 102 in the vehicle 100 through rectification and power conversion.

The vehicle 100 using electricity as power may include an on-board charger (OBC), and the on-board charger may transmit and receive a controller area network (CAN) message to and from a battery management system (BMS)

according to an energy management strategy or policy to control charging and discharging of the battery 102 through the DC-DC converter of the vehicle 100.

Here, the vehicle 100 using electricity as a power may be defined as a vehicle 100 that generally supplies an energy source for an electric motor, which is a power device, with an electric current induced from a rechargeable energy storage device, such as a battery 102.

However, the electric vehicle 100 according to an exemplary embodiment of the present disclosure may include a hybrid vehicle including both an electric motor and a general internal combustion engine, and may include not only vehicles, but also motorcycles, carts, scooters, and electric bicycles.

Furthermore, the electric vehicle may include a power receiving pad 101 including a receiving coil to charge the battery 102 in a wireless manner, and may include a plug connection port to charge the battery 102 in a wired manner.

In the instant case, the electric vehicle 100 configured for charging the battery 102 by wire may be referred to as a plug-in electric vehicle (PEV).

Here, a charging terminal 104 may be connected to a power grid 105 or a power backbone, and may provide a power transmitting pad 103 including a transmitting coil with AC power or DC power through a power link.

Furthermore, the charging terminal 104 may communicate with the power grid 105 or an infrastructure management system or infrastructure server 200 that manages the power grid 105 through wired/wireless communication, and may perform wireless communication with the electric vehicle.

Here, the wireless communication may include Bluetooth, Zigbee, cellular, and a wireless local area network (WLAN).

Furthermore, for example, the charging terminal 104 may be located in various places, such as a parking lot attached to an electric vehicle owner's house, a parking area for charging an electric vehicle at a gas station, a shopping center, or a parking area at work.

Here, a process of wirelessly charging the battery 102 of the electric vehicle is performed by placing the power receiving pad 101 of the electric vehicle in an energy field of the power transmitting pad 103 so that the transmitting coil of the power transmitting pad 103 and the receiving coil of the power receiving pad 101 perform mutual interaction or coupling with each other. The interaction or coupling causes an electromotive force to be induced in the power receiving pad 101, and the battery 102 is charged by the electromotive force.

Furthermore, all or part of the charging terminal 104 and the power transmitting pad 103 may be referred to as a ground assembly (GA), and the GA may refer to the previously defined meaning.

Furthermore, all or part of internal components of the power receiving pad 101 of the electric vehicle and other electric vehicles may be referred to as a vehicle assembly (VA), in which the VA may refer to the previously defined meaning.

Here, the power transmitting pad 103 or the power receiving pad 101 may be configured as being non-polarized or being polarized. In the instant case, when a pad is non-polarized, the pad is provided with one pole at the center portion thereof and opposite poles on the external periphery thereof.

Here, the magnetic flux may be formed to exit at the center portion of the pad and return at all external boundaries of the pad. Furthermore, when a pad is polarized, either end of the pad may have a respective pole. Here, the magnetic flux may be formed based on the orientation of the pad.

Figure 3:
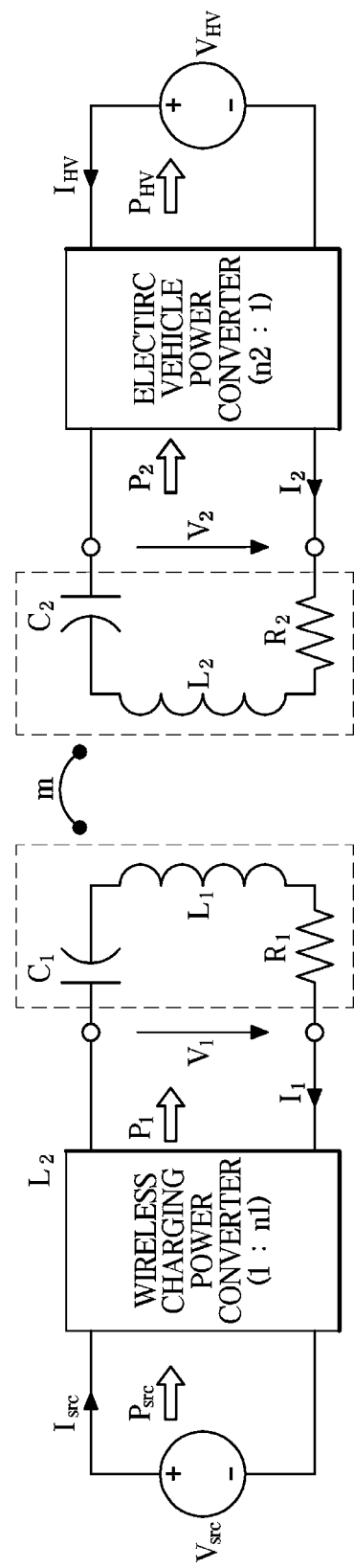
FIG. 3 is a diagram illustrating a wireless charging circuit for wireless power transmission in a vehicle according to an exemplary embodiment of the present disclosure.

FIG. 3 is a diagram illustrating a wireless charging circuit for wireless power transmission in a vehicle 100 according to an exemplary embodiment of the present disclosure.

Referring to FIG. 3, a schematic configuration of a charging circuit of a wireless charging system of the vehicle 100 using electricity as power is shown.

Here, the left circuit of FIG. 3 represents all or part of components forming a power source $V_{SRC}$ supplied from the power grid 105, the charging terminal 104, and the power transmitting pad 103, and the right circuit of FIG. 3 represents all or part of components in the electric vehicle, including the power receiving pad 101 and the battery 102.

First, in the left circuit of FIG. 3, an output power $P_{SRC}$ corresponding to the power source $V_{SRC}$ supplied from the power grid 105 may be provided to a wireless charging power converter, and the wireless charging power converter may perform frequency and AC/DC conversion on the received power $P_{SRC}$ to output power $P_1$ so that a transmitting coil $L_1$ emits an electromagnetic field at a desired operating frequency.

The wireless charging power converter may include at least one of an AC/DC converter configured to, when the power ($P_{SRC}$) supplied from the power grid 105 is AC power, convert the AC power into DC power and a low-frequency converter (or an LF converter) configured to convert DC power into power of an operating frequency suitable for wireless charging. The operating frequency may be determined to lie between 80 kHz and 90 kHz, for example.

Power $P_1$ output from the wireless charging power converter may be supplied to a circuit including a transmitting coil $L_1$, a first capacitor $C_1$, and a first resistor $R_1$, in which the first capacitor $C_1$ may be determined to have an element value that provides an operating frequency suitable for charging together with the transmitting coil $L_1$. Furthermore, here, the first resistor $R_1$ may refer to a power loss generated by the transmitting coil $L_1$ and the first capacitor $C_1$.

Here, the transmitting coil $L_1$ may be subject to electromagnetic coupling defined by a coupling coefficient m with a receiving coil $L_2$ so that power is transmitted or power is induced to the receiving coil $L_2$. Therefore, in the present disclosure, it should be understood that when power is referred to as being transmitted, terms "power transmission" and "power inducing" are used interchangeably.

Here, power $P_2$ induced or transmitted to the receiving coil may be provided to an electric vehicle power converter. In the instant case, a second capacitor $C_2$ may be determined to have an element value that provides an operating frequency suitable for charging together with the receiving coil $L_2$, and a second resistor $R_2$ may refer to a power loss generated by the receiving coil $L_2$ and the second capacitor $C_2$.

The electric vehicle power converter may include an LF/DC converter that converts the received power $P_2$ of a specific operating frequency back to DC power including a voltage level suitable for the battery 102 ($V_{HV}$) of the electric vehicle.

When the electric vehicle power converter outputs power $P_{HV}$ obtained by converting the received power $P_2$, the output power $P_{HV}$ may be used to charge the battery 102 ($V_{HV}$) built in the electric vehicle.

Here, the right circuit of FIG. 3 may further include a switch for selectively connecting or disconnecting the receiving coil $L_2$ to or from the battery 102 ($V_{HV}$).

Here, the resonance frequencies of the transmitting coil $L_1$ and the receiving coil $L_2$ may be configured to be similar or identical to each other, and the receiving coil $L_2$ may be located at a short distance of the electromagnetic field generated by the transmitting coil $L_1$.

Here, the circuit shown in FIG. 3 is merely an example of a circuit for power transmission in an electric vehicle wireless charging system applicable to various exemplary embodiments of the present disclosure, and it should be understood that the present disclosure is not limited to the circuit in FIG. 3.

On the other hand, because the power loss may increase as the transmitting coil $L_1$ and the receiving coil $L_2$ are located at a greater distant away from each other, it is important to set the positions of the transmitting coil $L_1$ and the receiving coil $L_2$. In the instant case, the transmitting coil $L_1$ may be included in the power transmitting pad 103 shown in FIG. 2, and the receiving coil $L_2$ may be included in the power receiving pad 101 shown in FIG. 2.

Figure 4:
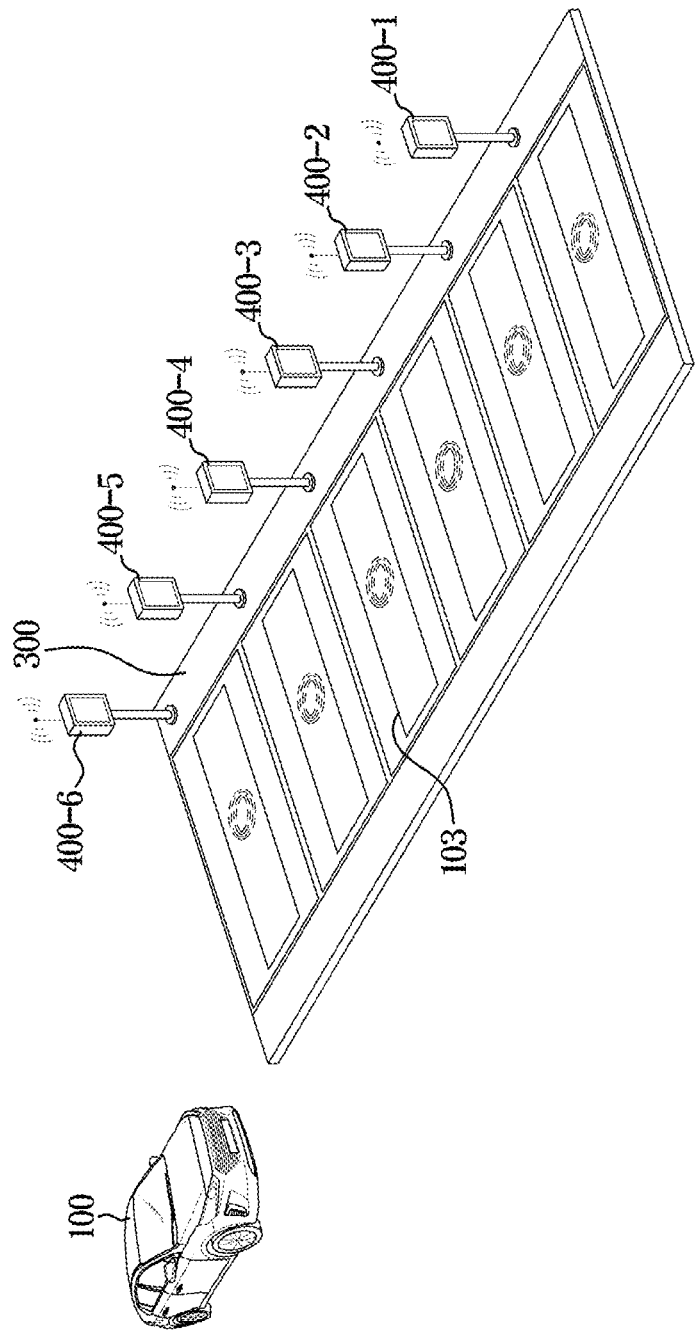
FIG. 4 is a diagram illustrating a wireless charging station including a plurality of chargers for a vehicle according to an exemplary embodiment of the present disclosure.

FIG. 4 is a diagram illustrating a wireless charging station 300 including a plurality of chargers for a vehicle according to an exemplary embodiment of the present disclosure.

Referring to FIG. 4, the wireless charging station 300 may be a public wireless charging facility including a plurality of wireless charging terminals 104.

The wireless charging station 300 may include a ground assembly GA provided in the charging terminal 104 and a charging spot configured for charging an electric vehicle.

In the case of charging using a wireless power transmission method, the vehicle 100 needing to charge the battery 102 may move to the GA, which is located in the charging terminal 104 or the charging spot configured for an electric vehicle, on the driving route.

When the electric vehicle is charging the battery 102, a vehicle assembly (VA) mounted on the electric vehicle forms an inductive resonance coupling with the power transmitting pad 103 of the GA located in the charging terminal 104 or the charging spot, and charges the battery 102 of the electric vehicle using power transmitted from the GA through the inductive resonance coupling.

The charging terminal 104 may include at least one GA and at least one GA controller configured for managing the at least one GA.

The GA may include at least one wireless communication device. The charging terminal 104 may refer to a place including at least one GA provided in homes, offices, public places, roads, parking lots, and the like.

The charging terminal 104 may include at least one wireless charger 400-1, 400-2, 400-3, 400-4, 400-5, and 400-6, and the at least one wireless charger 400-1, 400-2, 400-3, 400-4, 400-5, and 400-6 may periodically communicate with the server 200 that manages the charging terminal 104 so that charging station information is collected and managed.

The wireless chargers 400-1, 400-2, 400-3, 400-4, 400-5, and 400-6 may transmit information related to an ID, a charging method, charge information, a payment method, a charging station terminal ID, and charging station reservation information of the wireless chargers 400-1, 400-2, 400-3, 400-4, 400-5, and 400-6 to the electric vehicle 100.

When the vehicle 100 approaches the charging terminal 104 to be located at a predetermined distance or less from the charging terminal 104, communication with the server 200 managing the charging terminal 104 may be automatically established.

The vehicle 100 may receive a recommendation for the wireless charger 400 as described in the drawings below, select the wireless charger 400 and perform pairing with the wireless charger 400.

Thereafter, the vehicle 100 may move over the power transmitting pad 103 of the paired wireless charger 400 to proceed with charging.

Figure 5:
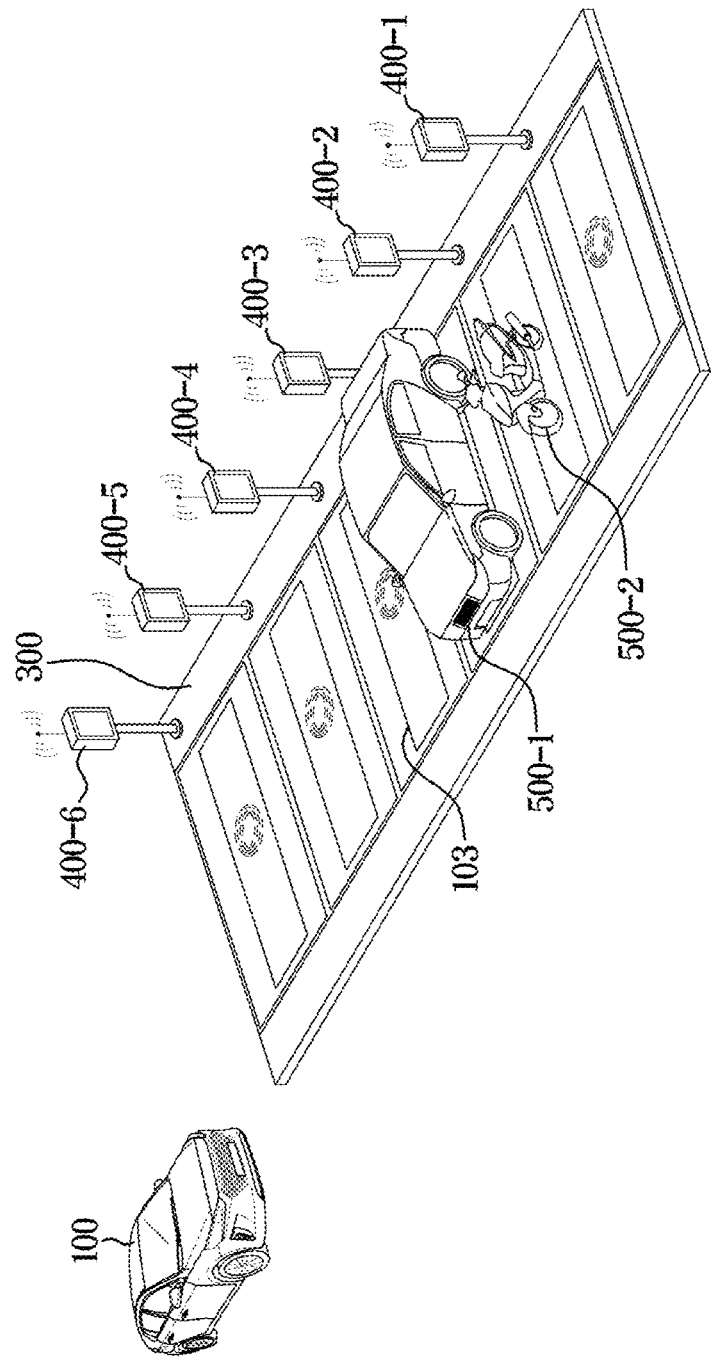
FIG. 5 is a diagram illustrating a case in which an obstacle exists in a wireless charging station including a plurality of chargers for a vehicle according to an exemplary embodiment of the present disclosure.

FIG. 5 is a diagram illustrating a case in which an obstacle is present in a wireless charging station including a plurality of chargers for a vehicle according to an exemplary embodiment of the present disclosure.

Referring to FIG. 5, it may be seen that obstacles 500 are present on some of the power transmitting pads 103 of the plurality of wireless chargers 400.

The obstacles 500 here include a vehicle 500-1 which is parked even after charging has already been completed, a vehicle 500-1 that does not support a wireless charging function or does not use electricity as a power, and a motorcycle 500-2 that does not support a wireless charging function or does not use electricity as a power.

However, the present disclosure is not limited thereto, and the obstacle 500 may include all objects which may prevent the electric vehicle 100 from entry due to being located on the power transmitting pad 103 even when the wireless charger 400 is not charging the battery 102.

The server 200 managing the charging terminal 104 may determine a wireless charger 400 as a chargeable terminal because the wireless charger 400 is not in progress of charging even when the obstacle 500 is present on the power transmitting pad 103 of the wireless charging station 300, and may recommend the wireless charger 400.

Accordingly, the vehicle 100 may have a confusion when the wireless charger 400 is displayed on the user interface 130 as a recommended charger even with the inability to charge.

Furthermore, when the obstacle 500 is present in a blind spot which is a location difficult for the driver to identify with the naked eyes or difficult to identify due to being far away from the current location, the driver has a hassle in moving the vehicle 100 to the front of the corresponding charger or alighting from the vehicle 100 for checking directly.

Therefore, to eliminate the inconvenience of the user, the vehicle 100 according to an exemplary embodiment combines information transmitted from the server 200 with information related to the obstacle 500 obtained from the camera 140 of the vehicle 100 to provide a convenience of use.

The controller 110 may control the camera 140 to analyze image data into a plurality of image frames to determine whether an obstacle 500 is present on the moving route.

In the instant case, there is no limitation in the method of determining the obstacle 500. For example, image analysis using the camera 140 and an ultrasonic sensor may be utilized.

The camera 140 for photographing the surroundings of the vehicle 100 may be provided in a plurality of units thereof and provided on the vehicle 100. For example, the cameras 140 may be provided on the front, rear, and both sides mirrors of the vehicle 100. Furthermore, the camera 140 may be implemented as an ultra-wide-angle camera 140 configured for securing a wide viewing angle.

The ultrasonic sensor is configured to detect an obstacle 500 positioned around the vehicle 100. The ultrasonic sensor generates and transmits ultrasonic waves, and measures the time taken for the ultrasonic waves to return after being reflected from the obstacle 500 or measures the signal magnitude of the reflected waves.

Furthermore, the ultrasonic sensor may determine the distance from the vehicle 100 to the obstacle 500 using the time from the ultrasonic waves transmission to the ultrasonic waves reception.

The controller 110 obtains the image data and the ultrasonic sensor data around the vehicle 100 through the camera 140 and the ultrasonic sensor. In the instant case, the controller 110 obtains the image data and the ultrasonic sensor data through the camera 140 and the ultrasonic sensor whenever the vehicle 100 moves a certain distance.

The controller 110 sets a region of interest (ROI) for recognizing a boundary line (an edge) of the obstacle 500 using the ultrasonic sensor data output from the ultrasonic sensor. Here, the ROI is a region on which position estimation of the obstacle 500 is to be performed, and a predetermined region is set based on a position of a boundary between the obstacle 500 and an empty space.

That is, the controller 110 detects a discontinuous position at which the ultrasonic sensor data changes rapidly, and sets a region of a preset size based on the discontinuous position as a ROI. For example, the controller 110 detects a position at which the ultrasonic sensor data rapidly decreases and a position at which the ultrasonic sensor data rapidly increases, and sets regions of interest based on the detected positions.

The controller 110 detects a straight line boundary (an edge portion) of the obstacle 500 perpendicular to the ground surface in the image data. The controller 110 stores the straight line edge portion detected from the image data based on motion information of the vehicle 100 in a storage device.

Furthermore, when the discontinuous position is detected based on the ultrasonic sensor data, the controller 110 checks whether the discontinuous position matches the position of the camera 140. That is, the controller 110 checks whether it is a point of time to detect the intersection of the straight line edge portions. In the instant case, the controller 110 checks whether the discontinuous position is a position at which detection of the obstacle 500 starts or a position at which detection of the obstacle 500 ends.

When the discontinuous position matching the center position of the camera 140 is the position at which detection of the obstacle 500 starts, the controller 110 detects the intersection of the straight line edge portions detected in the current image data and the subsequent image data. In the instant case, the controller 110 utilizes a straight line edge portion detected from the image data obtained within a predetermined distance from the current position of the camera 140 in the moving direction of the vehicle 100.

On the other hand, when the discontinuous position matching the position of the camera 140 is the position at which detection of the obstacle 500 end portions, the controller 110 detects the intersection of the straight line edge portions detected in the current image data and the previous image data.

In the instant case, the controller 110 utilizes a straight line edge portion detected from the image data obtained within a predetermined distance from the current position of the camera 140 in the direction opposite to the moving direction of the vehicle 100.

To detect the intersection of the straight line edge portions, the controller 110 integrates the straight line edge portions detected from continuous images based on motion information of the vehicle 100. For example, the controller 110 estimates the position on the current image, of the straight line edge portion detected in the previous image based on motion information of the vehicle 100, and then integrates the estimate with the straight line edge portion detected from the current image.

The controller 110 detects the intersection of straight lines connecting the straight line edge portion detected from the continuous images to the center portion position of the camera 140 in the ROI. In the instant case, the controller 110 detects a point that minimizes the vertical distance with the straight lines as the intersection.

In other words, the controller 110 removes an outlier using a RANdom SAmple Consensus (RANSAC) method and determines the intersection of the straight line edge portions detected within the ROI. The controller 110 may estimate the detected intersection as the position of the edge portion of the obstacle 500.

The controller 110 may detect the obstacle 500 through the above process, and exclude the wireless charger 400 determined to have the obstacle 500 present nearby from the recommendation list.

Figures 6, 7:
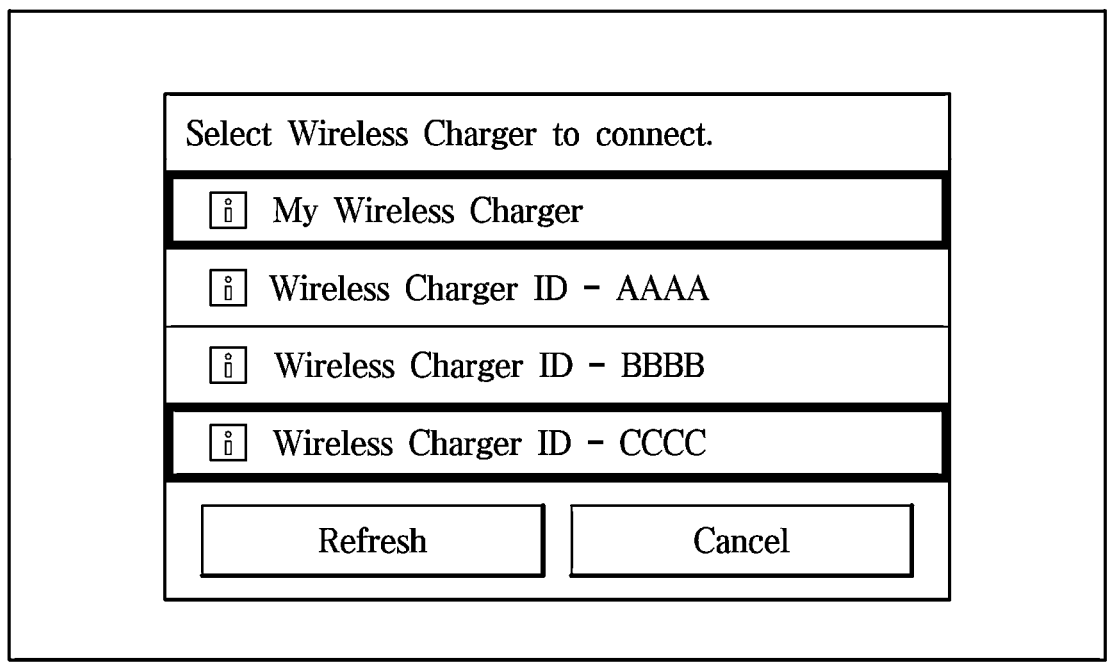
FIG. 6 is a diagram illustrating charging data of a plurality of wireless chargers for a vehicle according to an exemplary embodiment of the present disclosure.
FIG. 7 is a diagram illustrating recommended chargers emphasized and displayed in a pairing list for a vehicle according to an exemplary embodiment of the present disclosure.

FIG. 6 is a diagram illustrating charging data of a plurality of wireless chargers for a vehicle 100 according to an exemplary embodiment of the present disclosure.

Referring to the table of FIG. 6, the controller 110 may determine priority between the wireless chargers 400 in which the obstacle 500 is not present nearby and wireless charging is not in progress.

The external server 200 managing the wireless charging station 300 may determine and manage the charging efficiency according to the amount of charging power, the charging required time, and the charging failure count.

For example, the external server 200 may accumulate and store information related to the amount of charging power, the charging required time, and the charging failure count for each wireless charging terminal, and divide ranks from a highest rank (rank A) including the greatest amount of charging power compared to the charging required time to a lowest rank (rank F) including the lowest amount of charging power compared to the charging required time.

Furthermore, when the charging failure count is greater than or equal to a reference value, the server 200 may set the charging efficiency to rank F, which is the lowest rank, regardless of the amount of charging power compared to the charging required time.

Furthermore, when the vehicle 100 is paired with the recommended wireless charger 400 and charging is completed, the controller 110 may transmit information related to the amount of charging power, the charging required time, and the charging failure count to the external server 200 so that the information related to the charging efficiency described above is collected.

The controller 110 may receive the charging efficiency of the corresponding wireless charger 400 from the server 200, and list the wireless chargers in the order of a highest charging efficiency, but when the charging efficiency is the same, list the wireless chargers in the order of proximity to the current vehicle 100.

FIG. 7 is a diagram illustrating recommended chargers emphasized and displayed in a pairing list for a vehicle 100 according to an exemplary embodiment of the present disclosure.

Referring to FIG. 7, a list is generated according to the priority determined in FIG. 6, in which some of the wireless chargers 400 are emphasized and displayed, and the emphasized and displayed charger may be a recommended wireless charger 400.

The controller 110 may recommend the wireless charger 400 through the outputter 132 of the user interface 130, and there is no limitation in the recommending method.

In the instant case, the user interface 130 may be an AVN display system inside the vehicle 100, and the driver may pair the vehicle 1 with the recommended wireless charger by a touch of the AVN display or by a speech through the voice recognition system for the vehicle 100.

Figure 8:
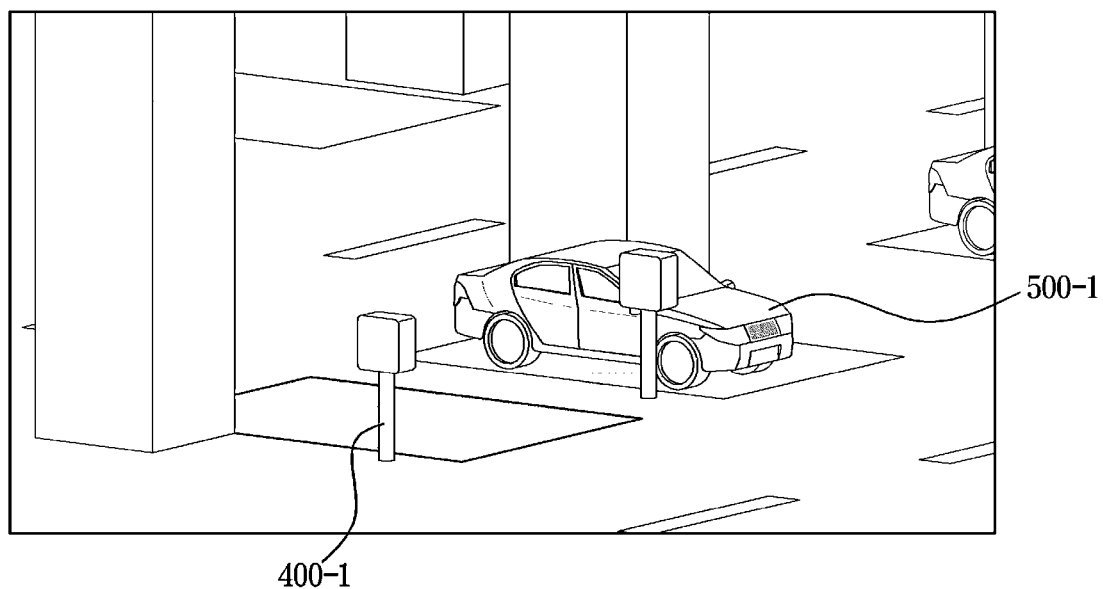
FIG. 8 is a diagram illustrating a recommended charger emphasized and displayed on a user interface of a vehicle according to an exemplary embodiment of the present disclosure.

FIG. 8 is a diagram illustrating a recommended charger emphasized and displayed on a user interface 130 of a vehicle 100 according to an exemplary embodiment of the present disclosure.

The controller 110 may generate a list according to the priority determined in FIG. 6, and display some of the wireless chargers 400 with emphasis on the user interface 130.

The controller 110 may display an image transmitted in real time through the camera 140 on an AVN display, and may emphasize and display a recommended wireless charging terminal in the image.

Since the driver may visually check the obstacle 500 in the image transmitted in real time and select a recommended wireless charging terminal, the driver's preference may be more actively reflected.

When the user selects the recommended wireless charging terminal according to the exemplary embodiments of FIGS. 7 and 8, the controller 110 may pair the vehicle 100 with the selected wireless charging terminal.

The controller 110 may, when the vehicle 100 is paired with the selected wireless charging terminal, control the outputter 132 to guide the vehicle 100 to be located over the power transmitting pad 103, which is a wireless charging area where the wireless charging terminal is located.

There is no limitation on the method of the controller 110 guiding the vehicle 100, and for example, a method of guiding a route for the vehicle by a navigation system may be used.

Figure 9:
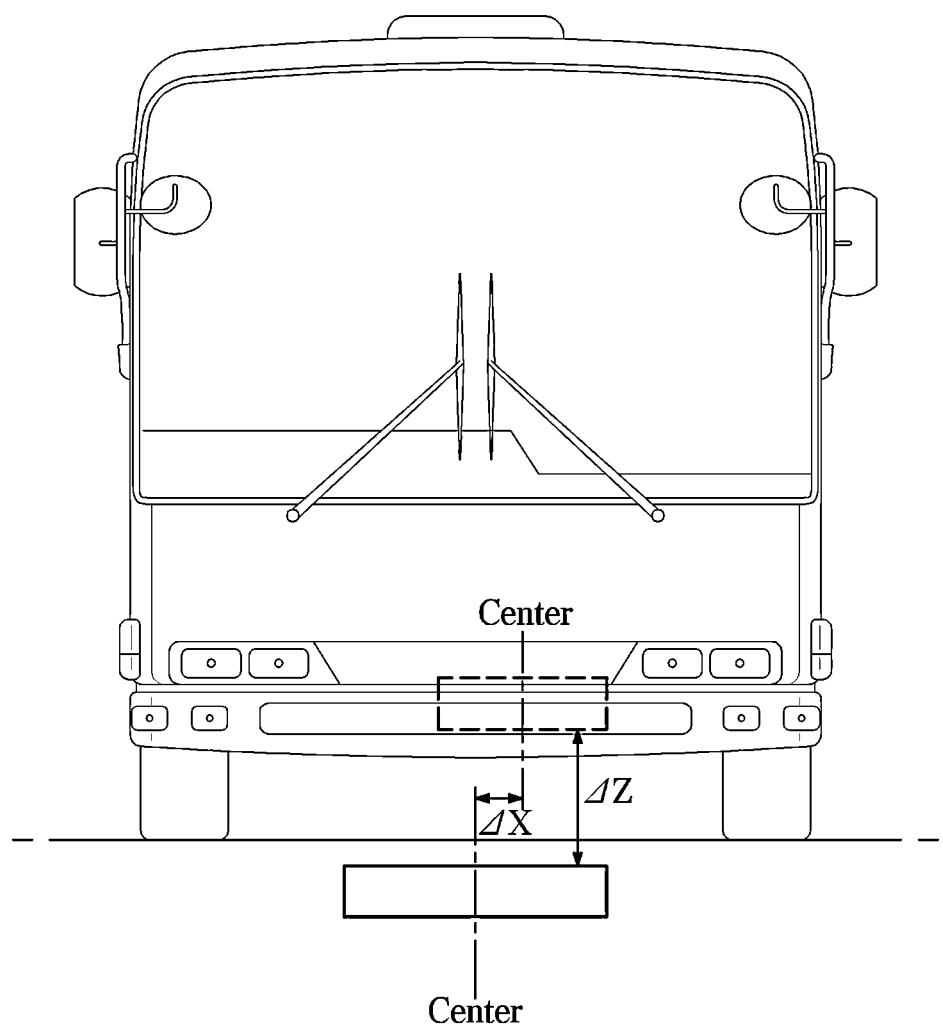
FIG. 9 is a diagram illustrating position correction according to a vehicle type according to an exemplary embodiment of the present disclosure.

FIG. 9 is a diagram illustrating position correction according to a vehicle type according to an exemplary embodiment of the present disclosure.

The controller 110 may classify the vehicle 100 into a large vehicle, a medium-sized vehicle, and a small vehicle according to the specifications of the vehicle 100 and guide the vehicle 100 to a position showing the optimum charging efficiency.

The position alignment of the vehicle 100 is not interpreted as being limited to the position alignment of the power transmitting pad 103 and the power receiving pad 101.

Here, the power transmitting pad 103 is illustrated as being located below the ground surface, but in a large vehicle having a high overall height, the power transmitting pad 103 may be located above the ground surface, and in a small vehicle having a low overall height, the power transmitting pad 103 may be located below the ground surface to correspond to the type of the vehicle 100.

Furthermore, the power receiving pad 101 of the electric vehicle may be defined in different categories according to the height (defined in the z direction) measured with respect to the ground surface. For example, the power receiving pad 101 may be set to class 1 when the height of the power receiving pad 101 on the ground surface is 100 mm to 150 mm, class 2 when the height of the power receiving pad 101 on the ground surface is 140 mm to 210 mm, and class 3 when the height of the power receiving pad 101 on the ground surface is 170 mm to 250 mm, in the instant case, depending on the specifications of the vehicle 100, the vehicle 100 may partially support charging, such as supporting only class 1 or supporting classes 1 and 2.

Accordingly, the controller 110 may preferentially recommend the wireless charger 400 having the maximum amount of charging power compared to the charging required time among a plurality of wireless chargers according to the specifications of the vehicle 100.

Furthermore, the position of the power transmitting pad 103 in the height direction (defined in the z direction) may be determined to lie between heights of the maximum class and the minimum class supported by the power receiving pad 101. For example, when the power receiving pad 101 only supports classes 1 and class 2, the power transmitting pad 103 may be determined to lie at a height between 100 m and 210 mm based on the power receiving pad 101.

Furthermore, the controller 110 may allow a gap between the center of the power transmitting pad 103 and the center of the power receiving pad 101 to fall within a range of limit values in the horizontal and vertical directions (defined in the x and y directions).

For example, the controller 110 may guide the vehicle 100 so that the gap falls within ±75 mm in the horizontal direction (defined in the x direction), and ±100 mm in the vertical direction (defined in the y direction).

Here, the relative positions of the power transmitting pad 103 and the power receiving pad 101 may have different limit values depending on the experimental results thereof, and it should be understood that the above numerical values are exemplary.

As described above, the controller 110 may display a position adjustment message or a position adjustment image on the user interface 130 for position adjustment to guide the vehicle 100.

Figure 10:
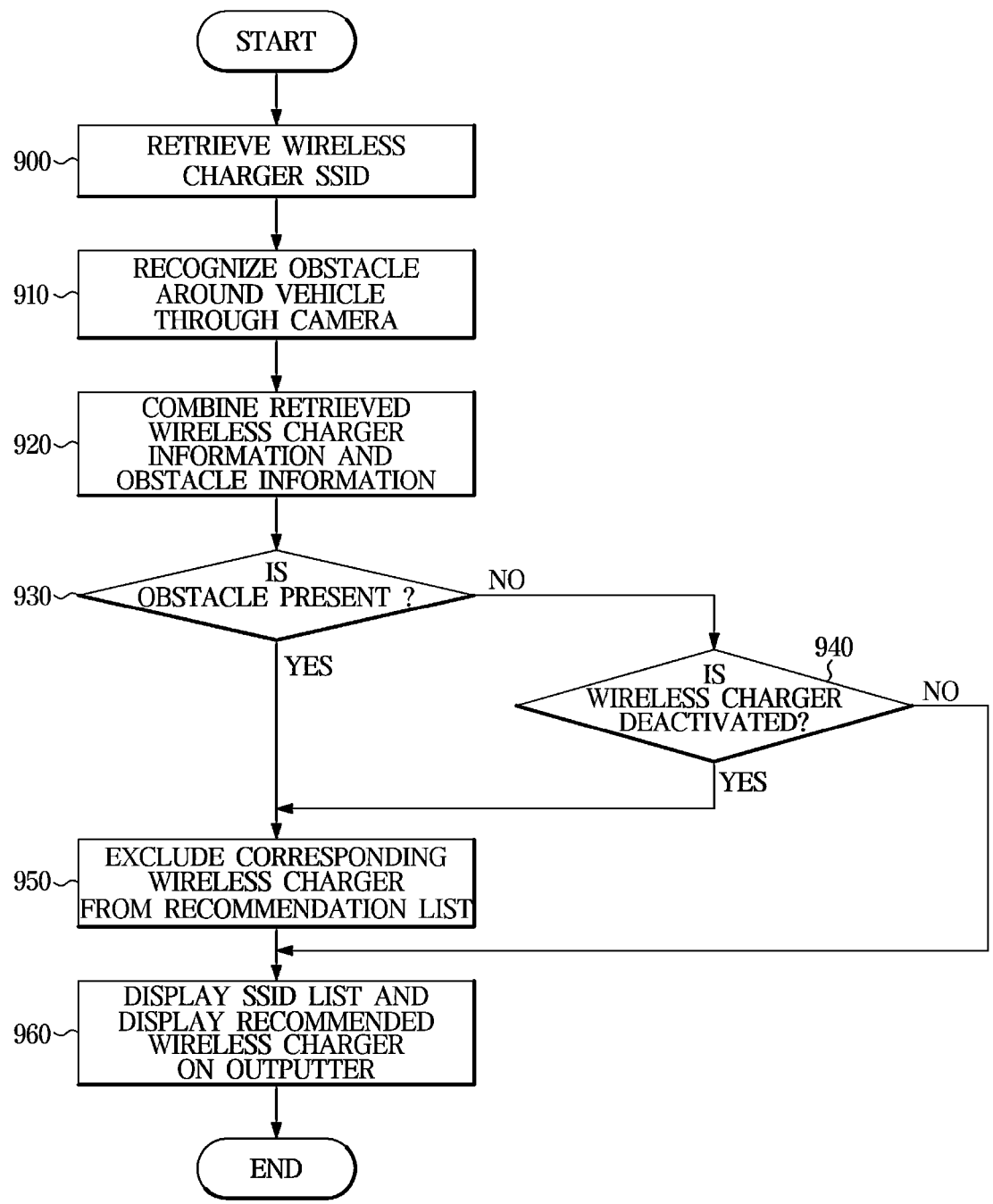
FIG. 10 is a diagram illustrating a control flowchart of a vehicle according to an exemplary embodiment of the present disclosure.

FIG. 10 is a diagram illustrating a control flowchart of a vehicle 100 according to an exemplary embodiment of the present disclosure.

Referring to FIG. 10, the controller 110 may enter the wireless charging station 300 and connect to communicate with the server 200 that manages the wireless charging station 300, and then request information related to the SSID of the wireless charger 400 (900).

The controller 110 may simultaneously recognize the obstacle 500 around the vehicle 100 and the wireless charger 400 through the camera 140 (910), and the recognition method may be an image analysis method. Thereafter, the controller 110 may combine the retrieved information related to the wireless charger 400 and the information related to the obstacle 500 (920).

The controller 110 may exclude the wireless charger 400 which is determined as being in a chargeable state from the information related to the wireless charger 400 but has the obstacle 500 present nearby (YES in operation 930), from the recommendation list (950).

The controller 110 may, when the wireless charger 400 does not have the obstacle 500 present nearby (NO in operation 930), determine whether the wireless charger 400 is deactivated (940), and when the wireless charger 400 is deactivated due to a malfunction of the wireless charger 400 (YES in operation 940), exclude the corresponding wireless charger 400 from the recommendation list (950).

The controller 110 may, when the wireless charger 400 does not have the obstacle 500 present nearby (NO in operation 930) and the wireless charger 400 is not deactivated (NO in operation 940), display the wireless charger 400 on the SSID list and display the recommended wireless charger 400 on the outputter 132 (960).

Figure 11:
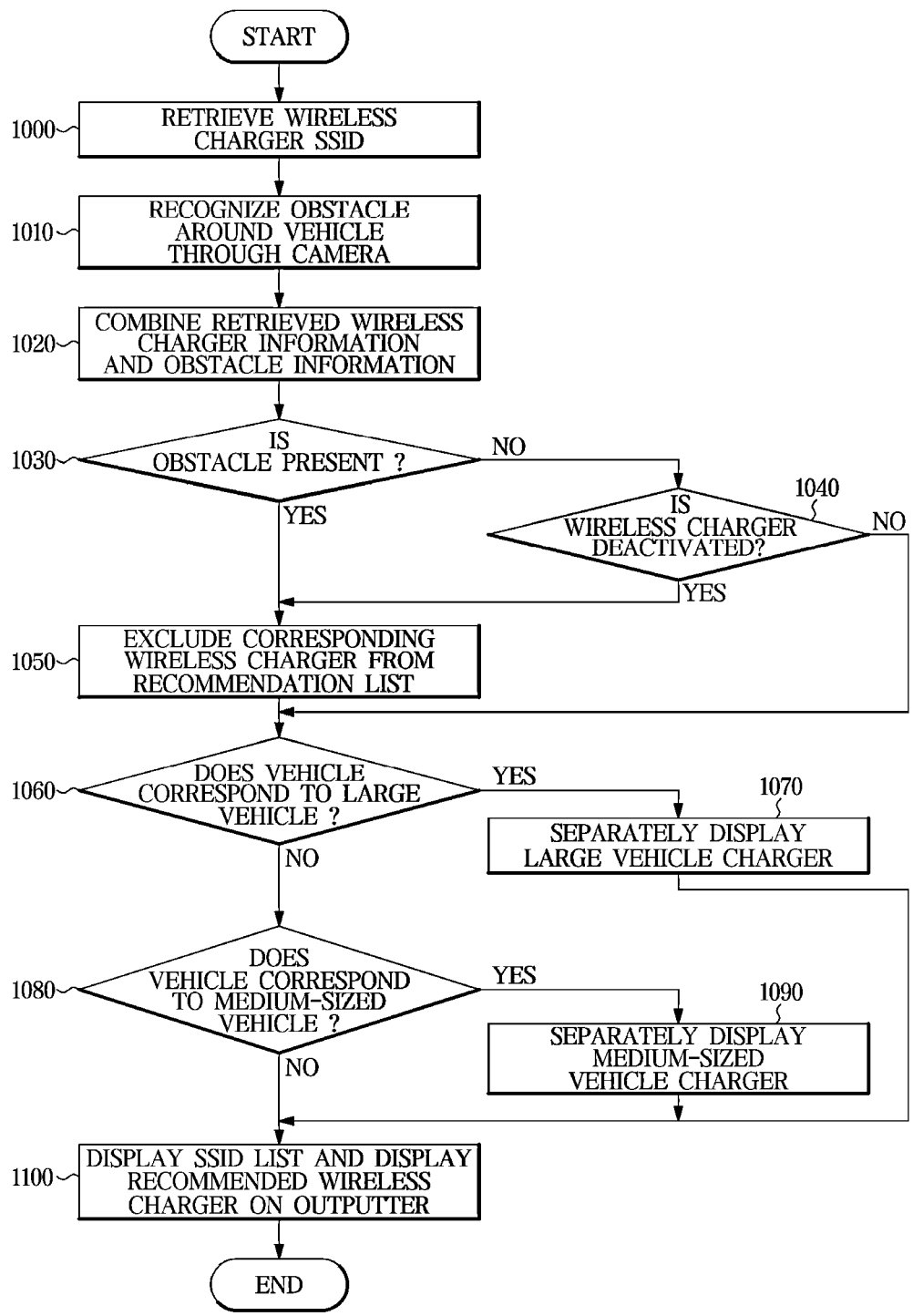
FIG. 11 is a diagram illustrating a control flowchart of a vehicle according to another exemplary embodiment of the present disclosure.

FIG. 11 is a diagram illustrating a control flowchart of a vehicle 100 according to another exemplary embodiment of the present disclosure.

Referring to FIG. 11, the controller 110 may enter the wireless charging station 300 and connect to communicate with the server 200 that manages the wireless charging station 300, and then request information related to the SSD of the wireless charger 400 (1000).

The controller 110 may simultaneously recognize the obstacle 500 around the vehicle 100 and the wireless charger 400 through the camera 140 (1010), and the recognition method may be an image analysis method. Thereafter, the controller 110 may combine the retrieved information related to the wireless charger 400 and the information related to the obstacle 500 (1020).

The controller 110 may exclude the wireless charger 400 which is determined as being in a chargeable state from the information related to the wireless charger 400 but has the obstacle 500 present nearby (YES in operation 1030), from the recommendation list (1050).

The controller 110 may, when the wireless charger 400 does not have the obstacle 500 present nearby (NO in operation 1030), determine whether the wireless charger 400 is deactivated (1040), and when the wireless charger 400 is deactivated due to a malfunction of the wireless charger 400 (YES in operation 1040), exclude the corresponding wireless charger 400 from the recommendation list (1050).

Thereafter, the controller 110 may, when the vehicle 100 corresponds to a large vehicle according to the specifications of the vehicle 100 (1060), display a large vehicle charger separately from the general charger (1070). Accordingly, the driver may select a charger configured for charging a large vehicle and pair the selected charger with the large vehicle.

The controller 110 may, when the vehicle 100 corresponds to a medium-sized vehicle according to the specifications of the vehicle 100 (1080), display a medium-sized vehicle charger separately from the general charger (1090). Accordingly, the driver may select a charger configured for charging the medium-sized vehicle and pair the selected charge with the medium-sized vehicle.

The controller 110 may, when the vehicle 100 does not correspond to both a large vehicle and a medium-sized vehicle, determine that the vehicle 100 is a small vehicle and recommend the wireless charger 400 (1100).

Because the controller 110 recommends the wireless charger 400 in consideration of the specifications of the vehicle 100 as well as the presence of the obstacle 500, user convenience and charging efficiency may be secured compared to the related art.

Because the predetermined embodiment related to the method of controlling the vehicle 100 overlaps the exemplary embodiment of the present disclosure related to the vehicle 100 described above, the same descriptions are omitted.

As is apparent from the above, the vehicle and the method of controlling the same can ease a difficulty that a driver inside the vehicle encounters in checking a charging-ability of a wireless charger, and facilitate pairing with a wireless charger.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
a camera configured to obtain image information around the vehicle;
a communicator configured to receive wireless charger information related to wireless chargers through communication with an external server; and
a controller communicatively connected to the communicator and configured to combine the received wireless charger information with the image information including information indicating restricted use of the wireless chargers, to recommend at least one wireless charger to a user interface among the wireless chargers,
wherein the wireless charger information comprises information on whether charging is possible, and
wherein the controller is configured to recommend the at least one wireless charger in which the received wireless charger information indicates a chargeable state and an obstacle is not present within an area of the at least one wireless charger based on the image information.

2. The vehicle of claim 1, wherein the controller is configured to detect straight line edge portions from the image information and determine an intersection of the straight line edge portions to determine whether the obstacle is present.

3. The vehicle of claim 1, wherein the controller is configured to use an amount of charging power and a charging required time of each of the wireless chargers stored in the external server to recommend the at least one wireless charger in which the amount of the charging power compared to the charging required time is a greatest first.

4. The vehicle of claim 1, wherein the controller is configured to use specifications of the vehicle stored in a memory to select the at least one wireless charger in which an amount of charging power compared to a charging required time is greatest among the wireless chargers according to a vehicle type and a vehicle height of the vehicle.

5. The vehicle of claim 1, wherein the controller is configured to display the recommended at least one wireless charger in a form of a list on the user interface.

6. The vehicle of claim 1, wherein the controller is configured to differently display an area of a wireless charger which is not recommended among the wireless chargers from an area of the recommended at least one wireless charger in a form of an image on the user interface.

7. The vehicle of claim 1, wherein the controller is configured to, when one of the recommended at least one wireless charger is selected, pair the vehicle with the selected wireless charger and guide the vehicle to an area of the recommended wireless charger.

8. The vehicle of claim 7, wherein the controller is configured to display a position adjustment message or a position adjustment image of the vehicle on the user interface to guide the vehicle.

9. The vehicle of claim 1, wherein the controller is configured to, when the vehicle is paired with the wireless charger and charging of the vehicle is completed, transmit an amount of charging power and a charging required time to the external server.

10. A method of controlling a vehicle, the method comprising:
obtaining, by a controller, image information around the vehicle from a camera;
receiving, by the controller, wireless charger information related to wireless chargers through communication with an external server; and
combining, by the controller, the received wireless charger information with the image information including information related to an obstacle around the wireless chargers, to recommend at least one wireless charger to a user interface among the wireless chargers,
wherein the wireless charger information comprises information on whether charging is possible, and
wherein the recommending of the at least one wireless charger includes:
recommending the at least one wireless charger in which the received wireless charger information indicates a chargeable state and an obstacle is not present within an area of the at least one wireless charger based on the image information.

11. The method of claim 10, wherein the recommending of the at least one wireless charger includes:
detecting straight line edge portions from the image information and determining an intersection of the straight line edge portions to determine whether the obstacle is present.

12. The method of claim 10, wherein the recommending of the at least one wireless charger includes:
using an amount of charging power and a charging required time of each of the wireless chargers stored in the external server to recommend the at least one wireless charger in which the amount of the charging power compared to the charging required time is a greatest first.

13. The method of claim 10, wherein the recommending of the at least one wireless charger includes:
using specifications of the vehicle stored in a memory to select a wireless charger in which an amount of charging power compared to a charging required time is greatest among the wireless chargers according to a vehicle type and a vehicle height of the vehicle.

14. The method of claim 10, further including
displaying the recommend at least one wireless charger in a form of a list on the user interface.

15. The method of claim 10, further including differently displaying an area of a wireless charger which is not recommended among the wireless chargers from an area of the recommended at least one wireless charger in a form of an image on the user interface.

16. The method of claim 10, further including
when one of the recommended at least one wireless charger is selected, pairing the vehicle with the selected wireless charger and guiding the vehicle to an area of the recommended wireless charger.

17. The method of claim 16, wherein the guiding of the vehicle includes displaying a position adjustment message or a position adjustment image of the vehicle on the user interface to guide the vehicle.

18. The method of claim 16, further including, when the vehicle is paired with the wireless charger and charging of the vehicle is completed, transmitting an amount of charging power and a charging required time to the external server.

* * * * *